(12) United States Patent
Shaked et al.

(10) Patent No.: US 7,209,128 B2
(45) Date of Patent: Apr. 24, 2007

(54) OPTICAL CODING OF POSITION INFORMATION ON PRINTED SURFACES

(75) Inventors: Doron Shaked, Haifa (IL); Guy de Warrenne Bruce Adams, Stroud (GB); Steven T. Rosenberg, Palo Alto, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 552 days.

(21) Appl. No.: 10/695,452

(22) Filed: Oct. 29, 2003

(65) Prior Publication Data

US 2005/0093829 A1    May 5, 2005

(51) Int. Cl.
  *G09G 5/00* (2006.01)
(52) U.S. Cl. .................................................. 345/176
(58) Field of Classification Search ................ 345/173, 345/175, 176; 178/18.01, 18.09; 382/238; 235/494; 250/492.22; 438/669
See application file for complete search history.

(56) References Cited

U.S. PATENT DOCUMENTS 6,095,566 A * 8/2000 Yamamoto et al. ........... 283/75

FOREIGN PATENT DOCUMENTS

JP    2000-222516    * 8/2000

* cited by examiner

*Primary Examiner*—Richard Hjerpe
*Assistant Examiner*—Abbas Abdulselam

(57) ABSTRACT

Optically detectable data encoding layouts for surfaces includes a primary lattice and a secondary lattice formed in interstitial areas between plural points on the primary lattice and one or more markings located on points on the secondary lattice. The primary lattice defines the layout of the secondary lattice. The data is encoded according to the positions of the markings on the secondary lattice. The layout provides absolute or relative page position encoding because, when the markings are imaged and decoded, the decoded data corresponds to the position of the corresponding marking on the surface.

11 Claims, 6 Drawing Sheets

OPTICAL CODING OF POSITION INFORMATION ON PRINTED SURFACES

CROSS-REFERENCE TO RELATED APPLICATIONS

The present invention relates to subject matter somewhat similar to that in the co-pending, commonly assigned application of Guy de Warren Bruce Adams and Doron Shaked, entitled "Visually Significant Marking in Position Encoded Glyph Carpets", filed Oct. 27, 2003, Lowe Hauptman Gilman & Berner Ser. No. 10/693,649.

STATEMENT REGARDING FEDERALLY FUNDED RESEARCH OR DEVELOPMENT

Not Applicable

INCORPORATION BY REFERENCE OF MATERIAL SUBMITTED ON COMPACT DISC

Not Applicable

BACKGROUND OF THE INVENTION

1. Technical Field

The present invention relates to methods of and apparatus for determining location codes on surfaces. More particularly, although not exclusively, the invention relates to improvements in generating optically detectable location codes on printed surfaces.

2. Background Art

There are a number of types of optically detectable codes which can be printed on a surface and can be used to encode digitized data of virtually any form.

Such optically detectable codes are known as glyphs or dataglyphs. A glyph is an optically detectable character or mark which carries encoded data by means of optically distinguishable characteristic such as shape.

An important application is where glyphs are used to encode the physical position of points on a surface. Glyphs used for this function are called Address Codes or Position Codes. Such codes can be read using an optical reader and decoded to determine the position of the reader on the page.

In this case, glyphs are usually positioned on the surface at the vertices of an accurately specified lattice or grid. The location data which is encoded into the glyphs represents the physical location of that particular point on the surface.

An example of position encoding glyphs is given in U.S. Pat. No. 6,548,768 to Anoto AB. According to '768, the glyph is a combination of the position of a visible dot in relation to an invisible virtual grid vertex reference point. The layout of the virtual grid is defined by the overall arrangement of the visible dots and is deduced by imaging a number of dot locations. The actual data is decoded by determining the position of the visible dot in relation to its virtual grid vertex reference point. For four dot positions around the grid vertex, four unique values can be encoded in any one grid position.

Another example of position codes is disclosed in IEEE Publication 0018-9162/10 entitled "Printed Embedded Graphical User Interfaces" by Hecht. Here, two unique glyphs are used, a '/' to encode a 0 and a '\' to encode a 1 and are arranged on in regular array. The code is a self-clocking code which means that each glyph is encoded to represent data at each position and the actual presence of the glyph is the clocking mechanism.

Position Codes thus enable finely resolved user selection of printed objects. Thus they can be used in paper-based GUI systems which follow the traditional point-and-click paradigm.

Glyph position codes can also be used to establish the position of the reference lattice or grid either directly, as in the case of Hecht, or indirectly as disclosed in '768.

Glyphs are often designed as unitary characters where the encoding is represented by the intrinsic optical structure of the character. In the case of '/' and '\' this intrinsic character is the orientation of the stroke. However, a glyph can also be constituted by the geometrical relationship between an optically detectible feature and a fixed reference point as in the case of the Anoto disclosure.

Two of the major issues with optical encoding of any kind are firstly the requirement that the glyphs not unduly interfere with the appearance of the page as a whole. Secondly, reasonably high coding densities are required in order to encode useful amounts of information into a given page area. The present invention attempts to address these issues by providing a glyph position code system which is optically neutral to the observer and has improved data encoding capacity.

SUMMARY OF THE INVENTION

In one aspect, the invention provides an optically detectable data encoding layout for a surface, the data encoding layout including:

a primary lattice;
a secondary lattice formed in the interstitial areas formed by the primary lattice;
one or more secondary markings located on points on the secondary lattice wherein the data is encoded according to the positions of the markings on the secondary lattice.

The primary lattice is preferably defined by a plurality of primary markings, each located at the vertices of the primary lattice Preferably, the data encoding corresponds to location encoding which specifies the physical location of each secondary marking on the page.

Preferably, the physical location of the secondary marking on the page can be decoded to provide a logical page-space location, where the logical page-space is defined by the largest unique page area which is possible given a specific location encoding algorithm.

Preferably, the primary lattice is a regular substantially square lattice, rectangular, triangular or other regular lattice shapes.

In an alternative embodiment, the pitch of the primary and/or the secondary lattice varies depending on the physical position on the page.

Such primary and/or secondary lattice pitch variation may be discontinuous or alternatively the variation may be progressive.

The primary and/or secondary lattice pitch variation is preferably such that a reading device, detecting and decoding the marks within a specified field of view, is able to detect and compensate for the pitch variation so as to distinguish the primary and secondary lattice.

In a preferred embodiment, the primary lattice has a primary marking at a sufficient number of lattice points so that the position of the primary lattice can be determined from the positions of the primary markings.

The primary and/or secondary markings are preferably dots having no intrinsic optically distinguishable structure.

In an alternative embodiment, the primary and/or the secondary markings have an intrinsic structure which allows additional data to be encoded therein.

In a further aspect, the invention provides an article incorporating encoded information by means of the data encoding layout as hereinbefore defined.

In yet a further aspect, the invention provides a method of encoding data onto a surface including the steps of:
applying to the surface primary markings, sufficient to define a primary lattice
applying data encoded markings in payload regions defined by interstitial areas between lattice points of the primary lattice, wherein the primary lattice specifies a reference coordinate system for evaluating the positions of the data encoding markings in the payload regions.

The data preferably corresponds to location data such that if the markings are imaged and decoded, the decoded data represents the position of the imaged area on the page.

The encoded data is preferably digitized data wherein when a plurality of the markings is imaged; the digitized data can be reconstructed from the decoded data

BRIEF DESCRIPTION OF THE DRAWINGS

The present invention will now be described by way of example only and with reference to the drawings in which.

DETAILED DESCRIPTION OF THE DRAWING

Figure 1:
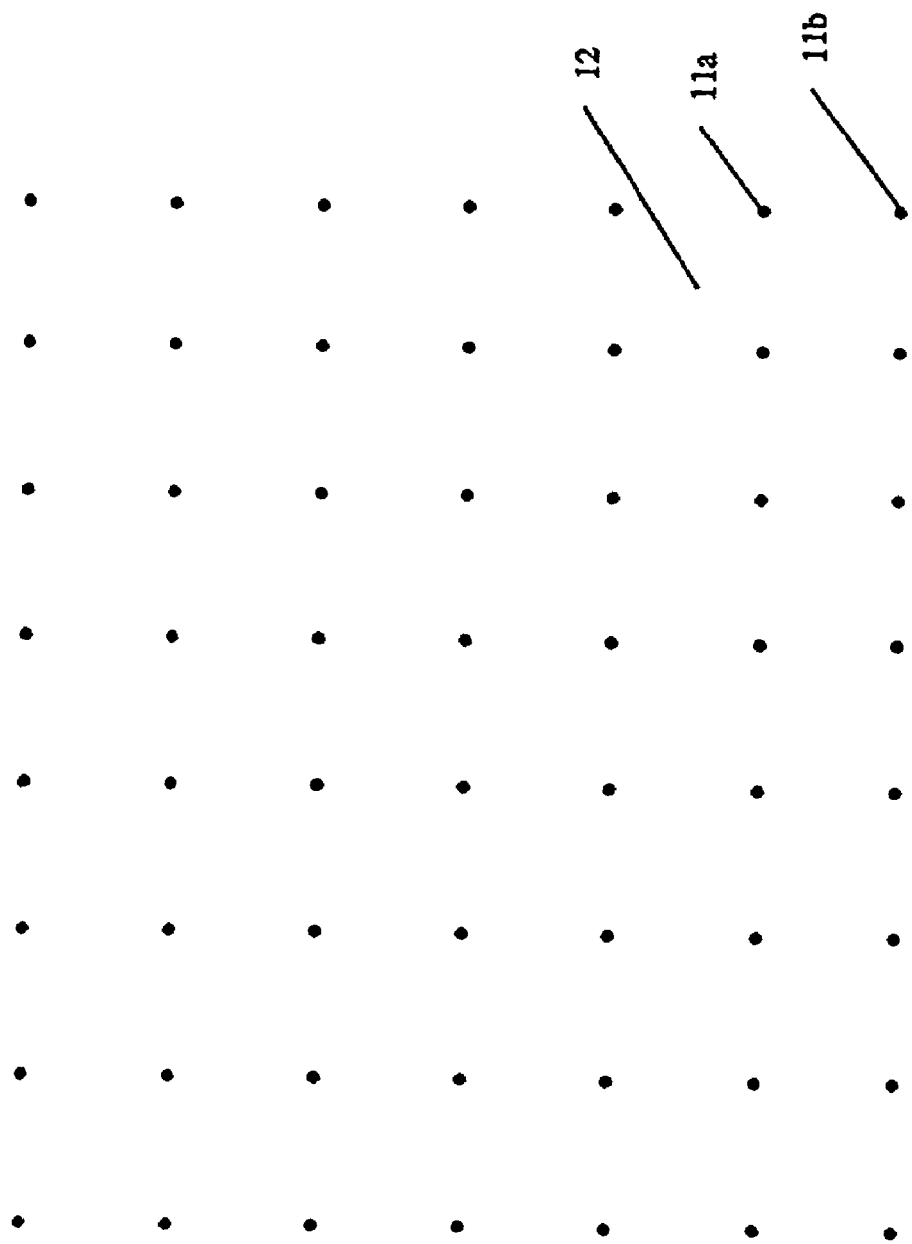
FIG. 1 is an illustrative example of a square primary lattice with primary markings at each lattice point.

Referring to FIG. 1, a primary lattice is shown with each lattice point 11a, 11b . . . populated by a primary marking. The primary lattice is regular with a square unit shape. The function of this lattice is to define and allow the areas 12 which are occupied by the secondary lattices to be accurately located.

A primary lattice with no secondary lattice points such as that shown in FIG. 1. has a substantial visual impact and creates an image which would be visually intrusive if it alone was used as a printed background on a page. Additional visual interference such as banding may be apparent as, in practice, this primary lattice would be relatively small.

Figure 2:
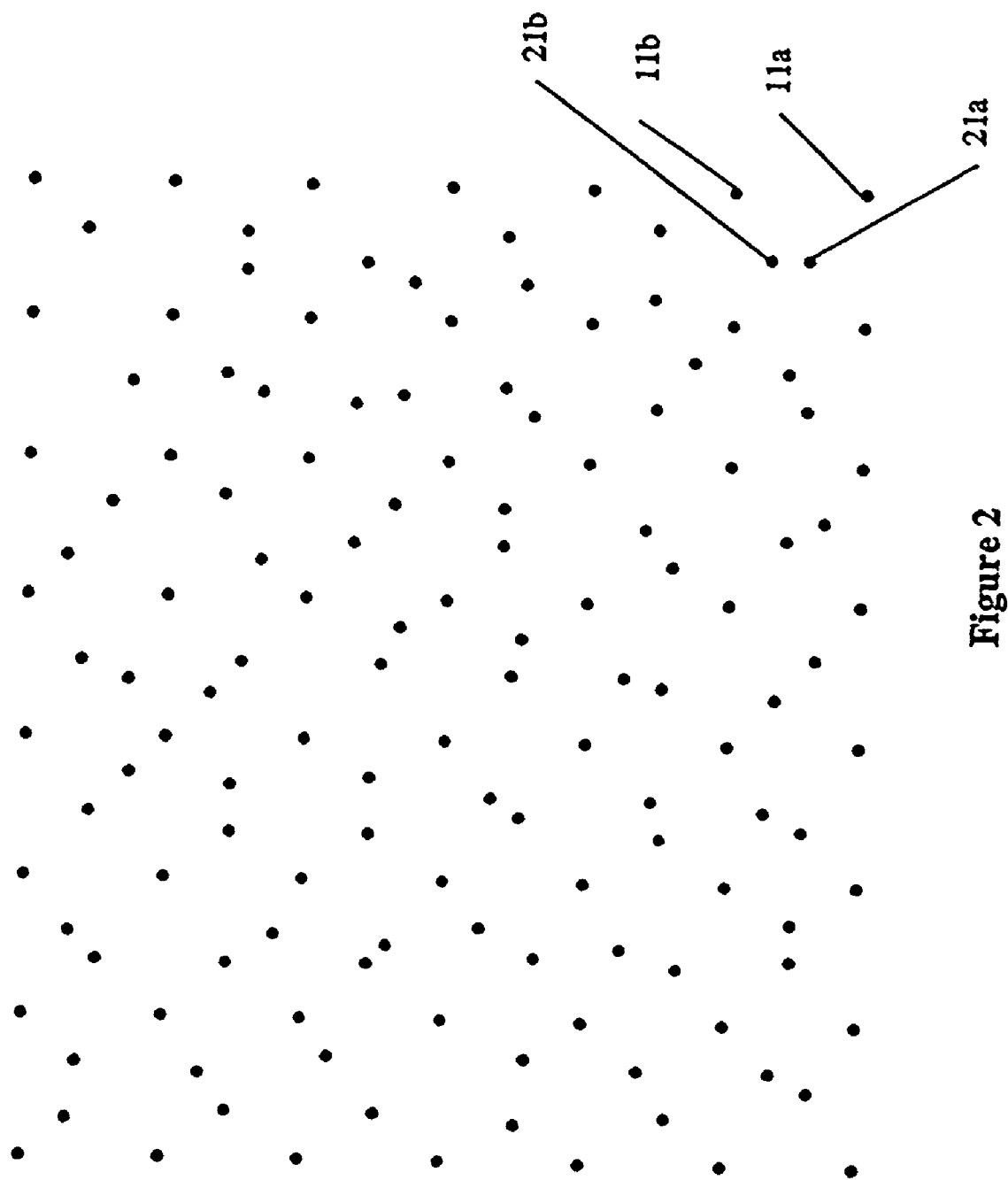
FIG. 2 is an illustrative example of the primary lattice of FIG. 1 populated with secondary markings.

Payload areas 12 between the lattice points of the primary lattice are populated with secondary markings. The result is shown in FIG. 2. FIG. 2 incorporates the same primary lattice (11a, 11b . . . ) as FIG. 1 but includes a payload corresponding to two secondary markings 21a and 21b per unit cell 12. These secondary markings are called the payload as they are carried in a specified region between the primary lattice points.

It has been found that inserting a relatively small number of secondary markings per unit cell into a regular primary lattice substantially nullifies the intrusive optical effect of the regular pattern in the primary lattice.

Figure 3:
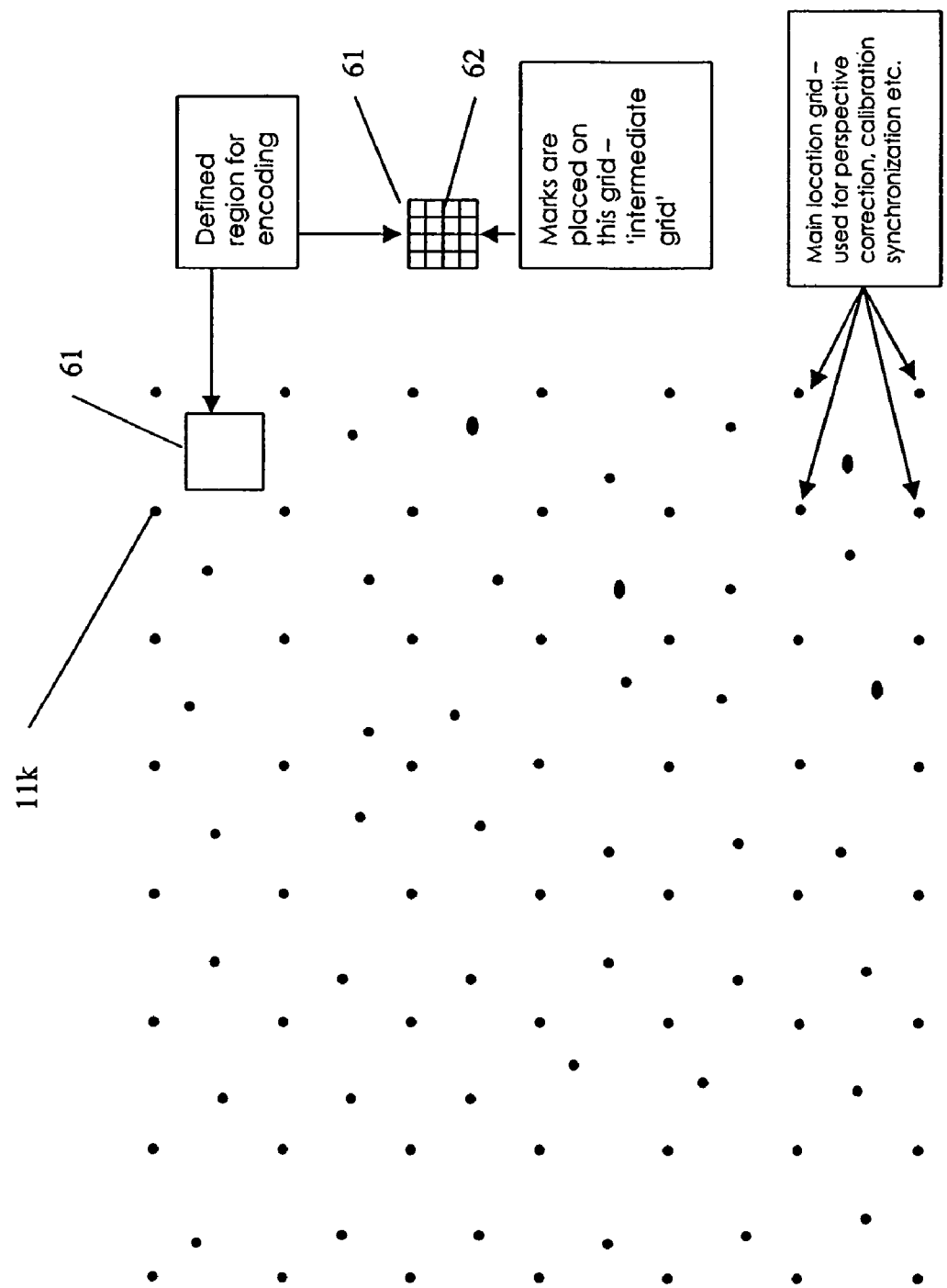
FIG. 3 is an illustration of a primary lattice with markings placed in payload, or interstitial, areas between the primary lattice points.

In the embodiment shown, the primary lattice markings specify a lattice which forms the reference grid for positioning the secondary markings. The secondary markings encode data by means of their position within the payload area 12 and this payload area is shown in more detail in FIGS. 3 and 4.

Figure 4:
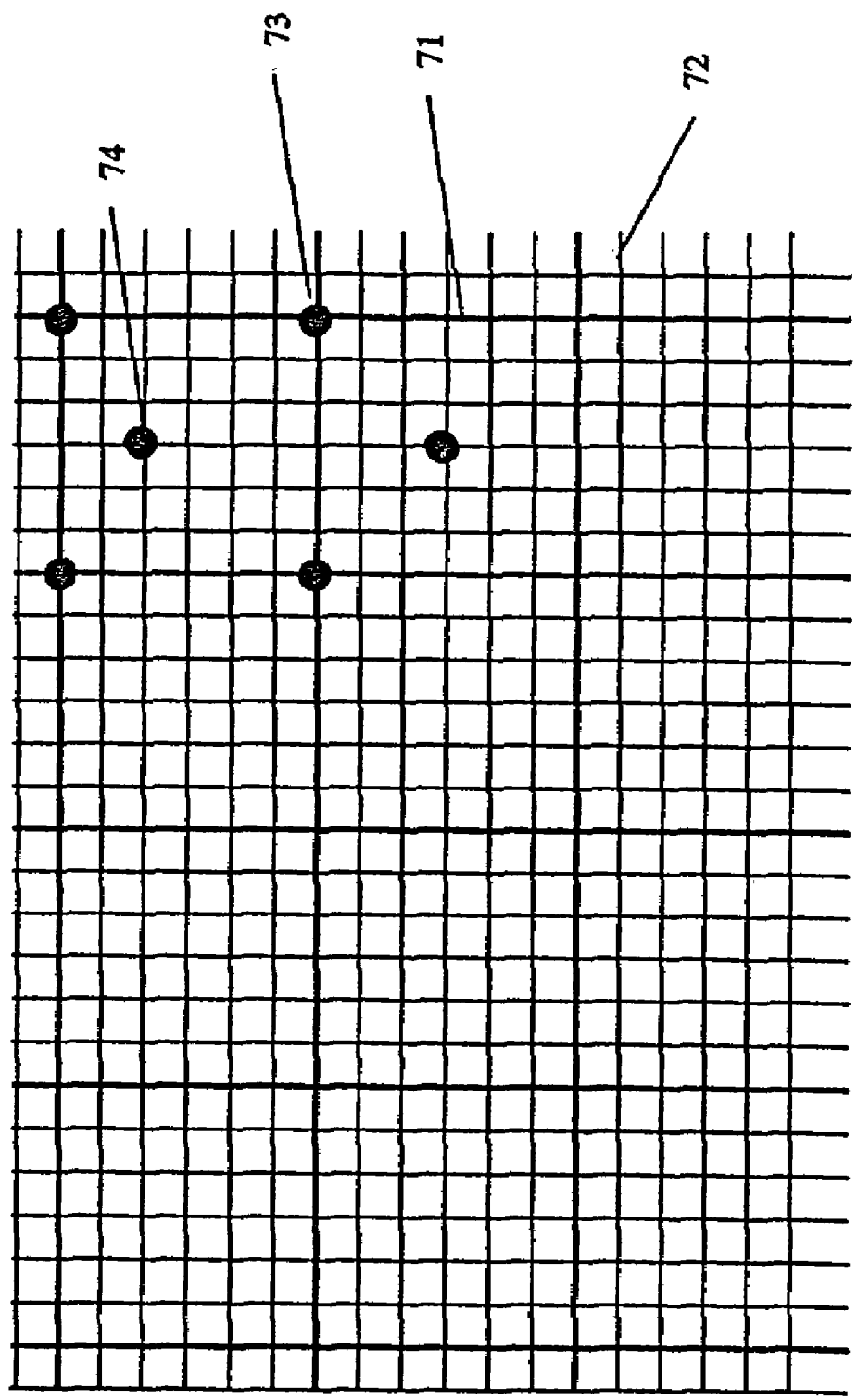
FIG. 4 is an illustration of a detailed view of a primary and secondary lattice with primary markings on four of the primary lattice points and two secondary markings populating adjacent secondary lattice areas.

Referring to FIG. 4, the same primary lattice as in FIG. 1 is populated with primary markings at its lattice points 11. The payload regions 61 (see FIG. 3) are shown as 4 by 4 unit areas (i.e.; 5 by 5 grid intersections) on which secondary markings 74 are located. The payload region does not extend to the full area defined by the primary markings. This is to ensure that the secondary markings in the payload region 61 are not located too close to the primary lattice points as the result can be visually intrusive as the effective optical density is not dispersed.

The primary lattice can be extracted from the secondary lattice by a number of methods. In one embodiment, the primary lattice point markings are the same shape as the secondary lattice point markings. That is, the primary and secondary markings are individually optically indistinguishable. When a page portion is imaged, the primary lattice point markings can be determined according to pattern extraction algorithms which are known in the art. Such methods take groups of markings and extracts continuous, regularly spaced parallel rows of markings from them. These parallel lines correspond to the grid lines of the primary lattice. Other techniques are possible including diffraction-based optical spatial filtering where the two-dimension Fourier transform of a regular dot grid pattern having a specified pitch is subtracted from the Fourier transform of the whole pattern. When the image is reconstructed only the secondary markings will remain. It is also possible to ensure that when encoded, sufficient secondary lattice to lattice variation, or dither, occurs. This will assist the pattern extraction method.

Such techniques are known in the mathematical and image processing arts and, for brevity, will not be discussed in detail. It is not necessary for each and every primary lattice vertex point to be occupied by a primary marking. It is sufficient that the extraction algorithm be able to determine the layout of the primary lattice within the inherent accuracy of the imaging device. For example, with a relatively narrow field of view, a larger proportion of primary lattice points will need to be occupied. With a large field of view, fewer primary lattice points will need to be occupied. To this end, it is envisaged that with a sufficiently wide field of view, the primary lattice may have a substantial number of lattice points vacant. In an extreme case it may be possible to have all primary lattice points vacant with the primary lattice being determined by the overall payload locations and absence of primary markings spread over a large field of view.

According to another embodiment, the primary lattice markings may have a different shape to the secondary markings. This allows a relatively straightforward extraction technique as the primary grid is easily recognisable by an imaging system. This embodiment may be susceptible to optical artefacts caused by the optically distinguishable primary or secondary lattice. These artefacts may be kept to a minimum by keeping the density low as in FIG. 4 where they do not appear at all points, but at a spatial density sufficient such that an imaging device is capable of detection and extraction within its field of view.

The primary lattice allows perspective, skew and rotational corrections which may be needed depending on what type of imaging device is used.

The secondary lattice markings encode data according to their position in the payload area. Referring to FIG. 4, the payload area is a 5 by 5 grid into which one marking is placed. This would encode 5×5=25 points. If the imaging device is capable of imaging an area sufficient to decode the contents of the 4 by 4 primary (and secondary) lattices (i.e.; 16 in total), this would provide a maximum of $(5 \times 5)^{16} = 3.8 \times 10^{22}$ encoding values.

The data encoding space can be increased using additional secondary markings as shown in FIG. 1.

Figure 5:
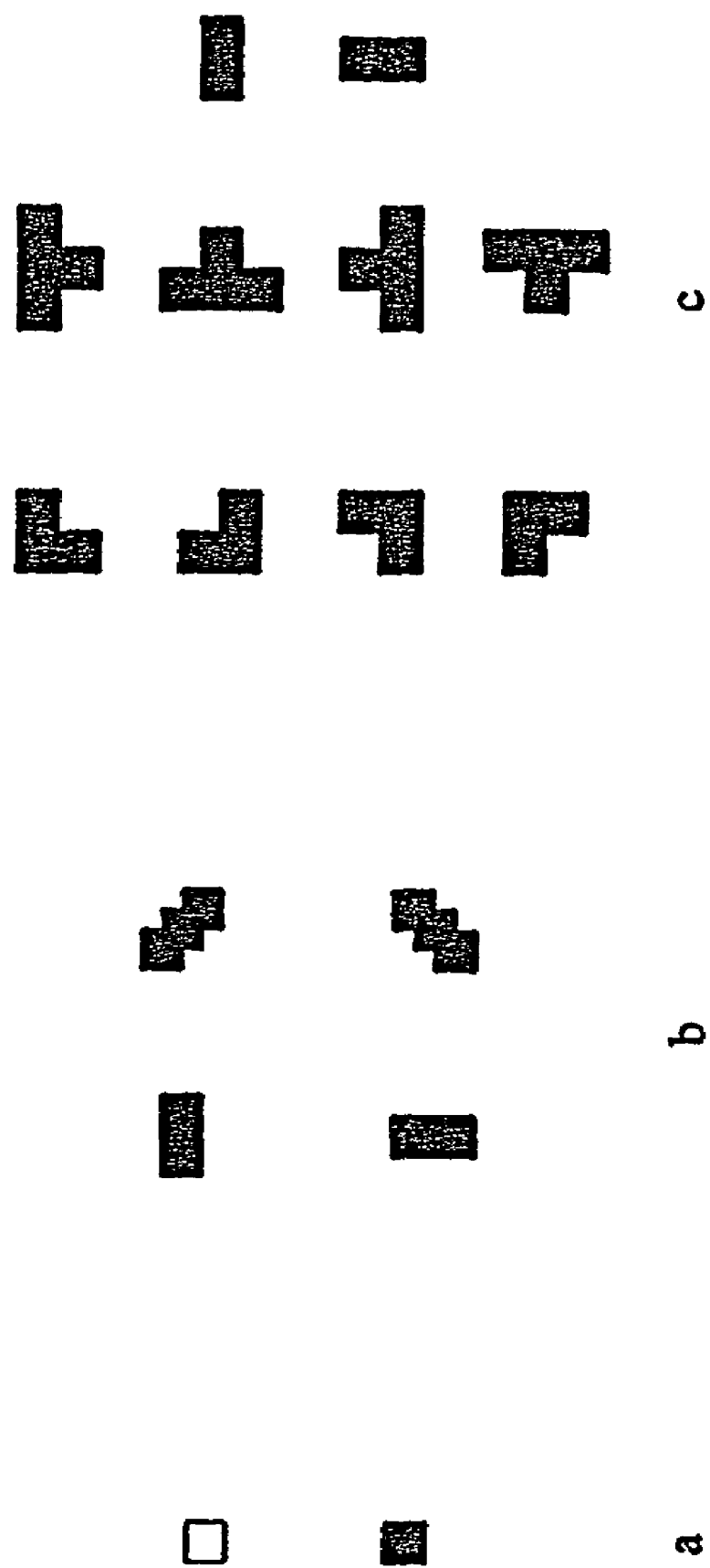
FIG. 5 is an illustration of a shape alphabet where the markings have optically distinguishable intrinsic structure.
Figure 6:
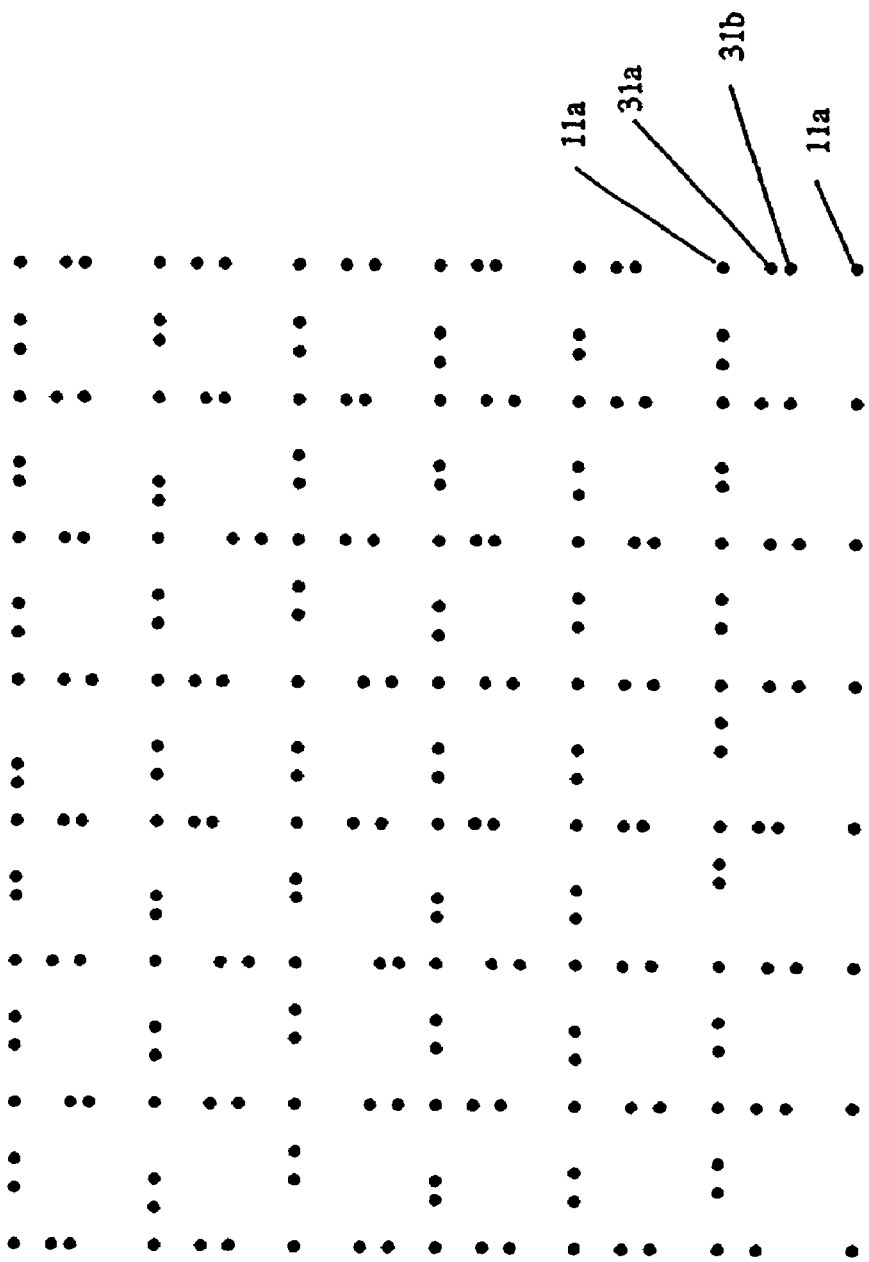
FIG. 6 is an illustrative example of a primary lattice partially populated with secondary markings between the primary lattice points located on the lattice lines.

The data encoding space can be further using secondary markings which encode additional data into the mark by virtue of intrinsic properties of the mark. Such a property is the shape of the mark. To this end, reference is made to applicants copending, commonly assigned application of Guy de Warren Bruce Adams and Doron Shaked, entitled Visually Significant Marking in Position Encoded Glyph Carpets, Lowe Hauptman Gilman & Berner, LLP, filed Oct. 27, 2003, Ser. No. 10/693,649, the disclosure of which is incorporated by reference. Using this technique, two levels of data encoding are possible based on the position of the mark in the payload area as well as the shape of the mark itself. An example of a set of glyphs having intrinsic shape-based optical characteristics is shown in FIG. 5. At a first level, these glyphs are able to encode data by means of their location in the payload area. At a second level, they encode further data by means of the specific shape of the marking.

In a further embodiment, shape encoding as described in the abovementioned document may be applied to the primary lattice markings and used to encode reference, synchronisation or other information which may be needed to accurately specify the primary grid shape and layout.

The encoding values given above are the maximum theoretical values for the given cases. They do not take into account reductions that will occur when measures such as sequence design (windowing algorithm), for example, pseudorandom binary, is included to enable the imaging device to be able to decode a unique position from any defined minimum set of lattice points. Further reductions in encoding efficiency will result from data redundancy encoding etc.

There are no limits on the pitch of the grid/size of the markings except those imposed by the printing and/or imaging technology as well as the intended use model. For example, documents would use a different pitch compared to a large poster.

Typically for a document a primary lattice pitch would be between 0.5 and 2 mm with the secondary lattice pitch being ⅛th of this. Conveniently with a boundary region of 2 secondary lattice increments this yields a central payload lattice of 5 by 5. At these dimensions the actual grid pitch will be determined by the printer capability. Laser marking engines differ from inkjet and LEP etc. However, when their smallest reliable marking characteristics and placement solutions are factored in, the pitch can be specified that will leave discernable marks on the secondary lattice.

In use the invention provides a very uniform appearance with the glyph background not interfering substantially with any foreground information.

In an alternative embodiment, the payload markings can be located along the lattice gridlines as shown in FIG. 5. Although this may produce a more significant background optical effect, this arrangement may be useful in certain situations. For examples maths based pages or particular forms where the more regular structure is not visually detrimental. In this case, the secondary lattice is the extreme case of the general description with only the outermost secondary lattice points utilised.

In a further embodiment, it is envisaged that it would be possible to vary the primary and/or the secondary pitch as a function of the position on the page. This may be to take into account obscuring material overprinted on the particular portions of the page or other constraints on the optical density of the background image.

For example, the lattice pitch may be smaller at the top of the page than at the bottom of the page with the pitch changing linearly as a function of the vertical position on the page. That is, the primary and secondary markings are closer together at the top than they are at the foot of the page. In such a case, so long at the imaging device can see sufficient primary lattice markings within a specified range of pitch geometry, it could still successfully extract the primary lattice from the imaged view, determine the position of the payload and calculate the position of the imaging device at the particular position on the page. Thus, there would be need to be specified a maximum rate of change of pitch over the field of view of the imaging device above which no reliable position extraction would be possible.

In another example, the lattice pitch may change discontinuously. If this pitch change occurs within the field of view of the imaging device and the primary lattice is capable of extraction on either side of the discontinuity, the successful primary lattice extraction and determination of the payload position will still be possible.

It is envisaged that the capability of detecting either gradual or discontinuous changes in the pitch of the primary/secondary lattices would be built into the image processing software of the imaging device and an implementation of this is considered to be within the purview of one skilled in the art.

Although the invention has been described by way of example and with reference to particular embodiments it is to be understood that modifications and/or improvements may be made without departing from the scope of the appended claims.

The invention claimed is:

1. An optically detectable data encoding layout for a surface, the data encoding layout including:
   a primary lattice;
   a secondary lattice formed in the interstitial areas formed by the primary lattice; and
   one or more secondary markings located on points on the secondary lattice wherein the data is encoded according to the positions of the secondary markings on the secondary lattice, wherein the data encoding corresponds to location encoding which specifies the physical location of the secondary marking on a page, and wherein the physical location of the secondary marking on the page corresponds to a location in a logical page-space, the logical page-space defined by the largest unique page area which is possible given the specific location encoding.

2. An optically detectable data encoding layout for a surface as claimed in claim 1 wherein the primary lattice is defined by a plurality of primary markings, each located at the vertices of the primary lattice.

3. An optically detectable data encoding layout for a surface as claimed in claim 1 wherein the primary lattice is a regular substantially square lattice, rectangular, triangular or other regular lattice shapes.

4. An optically detectable data encoding layout for a surface as claimed in claim 3 wherein the primary and/or secondary markings are dots having no intrinsic optically distinguishable structure.

5. An optically detectable data encoding layout for a surface as claimed in claim 3 wherein the primary and/or secondary markings have an intrinsic structure which allows additional data to be encoded therein.

6. An optically detectable data encoding layout for a surface as claimed in claim 1 wherein the pitch of the primary and/or the secondary lattice varies depending on the physical position of the lattice point at a particular point on the page.

7. An optically detectable data encoding layout for a surface as claimed in claim 6 wherein such primary and/or secondary lattice pitch variation is discontinuous or alternatively the variation may be progressive.

8. An optically detectable data encoding layout for a surface as claimed in either claim 6 or 7 wherein the primary and/or secondary lattice pitch variation is such that a reading device, detecting and decoding the marks within a specified field of view, is able to detect and compensate for the pitch variation so as to distinguish the primary and secondary lattice.

9. An article incorporating data encoded information including a data encoding layout as claimed in any one of claims 1, 2 or 3 to 7.

10. A method of encoding data onto a surface including the steps of:

applying a primary lattice to the surface applying data encoding markings in payload regions which are defined by the interstitial areas between lattice points of the primary lattice, wherein the primary lattice specifies a reference coordinate system for evaluating the positions of the data encoding markings in the payload regions, wherein the data corresponds to location data such that if the markings are imaged and decoded, the decoded data represents the position of the imaged area on the page, and wherein the physical location of the markings on the page correspond to a location in a logical page-space, the logical page-space defined by the largest unique page area which is possible given the specific location encoding.

11. A method as claimed in claim 10 wherein the encoded data is digitized data wherein when a plurality of the markings are imaged, the digitized data can be reconstructed from the decoded data.

* * * * *